Feb. 17, 1953 J. L. RIFKIN 2,628,527
DIRECT-READING PHOTOELECTRIC EXPOSURE METER
Filed March 6, 1951
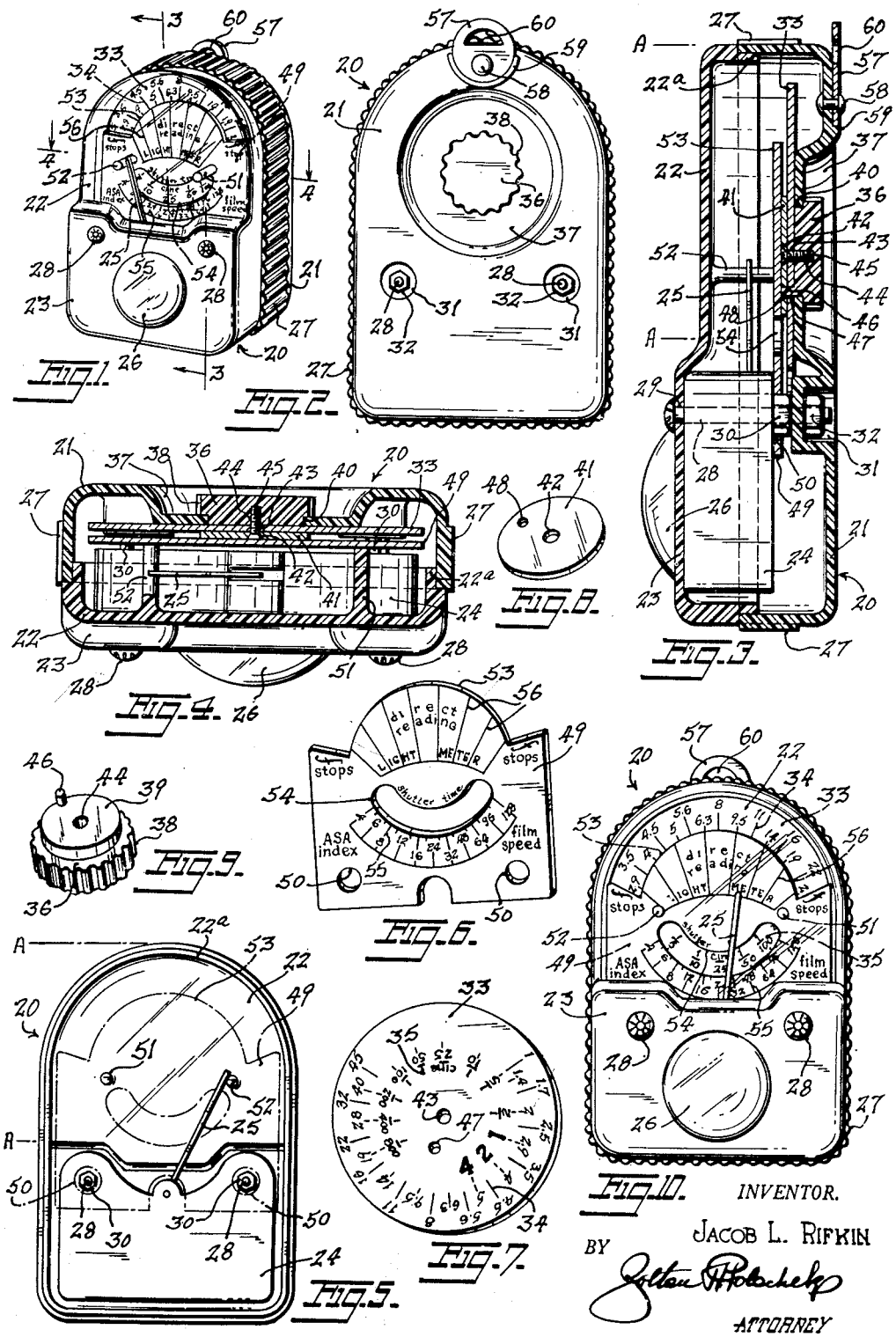
INVENTOR.
JACOB L. RIFKIN
BY
ATTORNEY Patented Feb. 17, 1953

2,628,527

UNITED STATES PATENT OFFICE 2,628,527

DIRECT-READING PHOTOELECTRIC EXPOSURE METER

Jacob L. Rifkin, Sunnyside, N. Y.

Application March 6, 1951, Serial No. 214,073

4 Claims. (Cl. 88—23)

This invention relates to new and useful improvements in a photo-electric exposure meter.

More specifically, the present invention proposes the construction of a direct-reading photo-electric exposure meter in which the preferred stop number for a given shutter speed and type of film can be taken directly form the meter without the need of referring to any computers or other scales.

Photo-electric exposure meters of the type proposed by the present invention are in general use for determining proper data under a wide variety of different lighting conditions and which consist essentially of a casing enclosing a photocell which generates an electric current proportional to the light reaching the photocell and a milliammeter actuated by that generated current and having a needle moved by the milliammeter. The needle has an area of movement over a scale calibrated in units of light measurement or which is divided into conveniently numbered segments and there is provided a computer or other scale for converting the reading of the first scale, as indicated by the needle, into proper terms of lens opening or stop number for a given shutter speed or a given film speed to make a proper exposure under the measured light conditions.

Such photo-electric exposure meters have been found objectionable in use in that there is a delay between the initial observation of the reading on the scale and the final computation of the required exposure data, during which time the light conditions may change, the subject may move into a differently lighted position or other factors may change which seriously affect the final results. Another disadvantage to such exposure meters is that the operation of the computer may require such skill or degree of judgment as to limit the use of the exposure meter to only the more expert photographers.

It is the purpose of the present invention to provide an improved photo-electric exposure meter which overcomes the disadvantages and limitations of the prior art meters by providing an improved instrument which reads directly in lens stops, with no computations or conversions necessary, while still covering the full useful range of variations in lens stops, shutter times, and film speeds or sensitivity.

The purposes of the present invention are accomplished by constructing the exposure meter so that it can be pre-set for both shutter time and film speed with such pre-setting bringing a suitably calibrated lens stop scale into position beneath the indicator end of the milliammeter operated needle in a manner to have the proper F stop number read directly from the meter for the pre-set shutter time and film speed.

It is a further object of the present invention to construct the exposure meter so that the shutter time scale and the film sensitivity (called "film speed") scale are each continuously variable over the full range of commonly used shutter times and film speed settings, and that for each change of shutter time setting with relation to any selected film speed setting, there is a corresponding change in the position of the lens stop scale to indicate the proper lens stop for the measured light condition which is correct, within the limits of accuracy of such exposure meters, for the specilc film speed setting and shutter time selected.

Another object of the present invention proposes constructing the exposure meter in a manner so that only a single knob need be manually manipulated for setting the lens stop scale in accordance with a desired film speed and shutter time commonly used so that thereafter the meter need only be exposed under the light in which the picture is to be taken for indicating the correct lens stop to be used.

Still further, the present invention proposes constructing the present photo-electric exposure meter to operate on the incident light method in a manner so that the meter can be used for measuring the amount of light falling on the subject. However, it is appreciated that the direct-reading features and construction of the parts related thereto would be the same whether the exposure meter was designed to be used as one of the incident-light type or one of the reflected-light type.

It is a further object of the present invention to construct a direct-reading photo-electric exposure meter which is simple and durable, which is efficient for its intended purposes and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the direct-reading photo-electric exposure meter constructed in accordance with the present invention.

Fig. 2 is a rear elevational view of Fig. 1.

Fig. 3 is an enlarged longitudinal sectional view taken on the line 3—3 of Fig. 1.

Fig. 4 is an enlarged transverse sectional view taken on the line 4—4 of Fig. 1.

Fig. 5 is an inside elevational view of the top section of the exposure meter.

Fig. 6 is a perspective view of the indicia plate, per se.

Fig. 7 is a perspective view of the indicia disc, per se.

Fig. 8 is a perspective view of the clamp disc, per se.

Fig. 9 is a perspective view of the knob, per se.

Fig. 10 is an elevational view of the meter showing the same in use indicating an F stop number for a given shutter speed and film speed.

The direct-reading photo-electric exposure meter, according to the present invention, includes a casing 20 having a bottom section 21 and a top section 22. The top section 22 fits into position over the bottom section 21 and the top section includes a peripheral flange 22ª fitted into the open side of the bottom section 21, as shown in Figs. 3 and 4.

At one end, the top section 22 is formed with a forwardly bulged portion 23 within which there is located a light sensitive unit 24 diagrammatically illustrated in Figs. 3 to 5. Such units 24 are generally known in the field of exposure meters and include a light sensitive cell for generating a small electric current to energize a milliammeter which in turn swings a pivotally mounted needle 25. Further details of the light sensitive unit 24 will not be given in this specification as such details are generally known in the field and form no part of the present invention.

Both sections of the casing 20 are molded of synthetic resin or plastic material and the entire bottom section 21 is made of opaque material. The top section 22 is molded to be opaque except for the area the complete width of the top section and between the letters A in Figs. 3 and 5 which is made transparent, and a transparent blister 26 on the forwardly bulged portion 23. The purpose for the transparent area between the letters A will become apparent as this specification proceeds.

The transparent blister 26 overlies the light sensitive cell of the light sensitive unit 24 so that the light to be measured can pass through that blister and strike the light sensitive cell as is generally known in the art of photo-electric exposure meters. All opaque portions of the casing 20 are preferably made black in color and the periphery of the bottom section 21 is provided with serrations 27 by which a good grip can be had on the meter.

The light sensitive unit 24 is secured in position against the inner face of the forwardly bulged portion 23 by several bolts 28 with the light sensitive cell thereof in alignment with the transparent blister 26. The bolts 28 pass through openings 29, see Fig. 3, formed in the forwardly bulged portion 23 and then through aligned holes formed in the light sensitive unit 24. Nuts 30 are threaded onto the bolts 28 and tightened against the light sensitive unit 24 securing the unit against the inner face of the forwardly bulged portion 23. The free ends of the bolts 28 project beyond the nuts 30 and pass through openings within aligned recesses 31 formed in the back wall of the bottom section 21. Nuts 32 are located within the recesses 31 and are threaded onto the ends of the bolts 28 securing the sections 21 and 22 of the casing 20 together.

Positioned within the casing 20 at the end of the top section 22 having the transparent area, indicated by the letters A in Figs. 3 and 5, and beneath the needle 25, there is an indicia disc 33. The disc 33 is preferably formed of a thin piece of relatively stiff cardboard, but may be formed of sheet metal, a resinous plastic material or any other similar material. Adjacent its outer periphery, the indicia disc 33 is imprinted with a lens stop scale 34 covering the complete range of F stop numbers from F-1 to F-45.

From Fig. 7 it will be noted that the scale 34 is calibrated to include the following numbers 1, 1.4, 1.7, 2, 2.5, 2.9, 3.5, 4, 4.5, 5, 5.6, 6.3, 8, 9.5, 11, 14, 16, 19, 22, 28, 32, 40 and 45—with the lower number denoting the larger stop openings as is generally known in the F-system of stop opening numbering. Inwardly of the lens stop scale 34, the indicia disc 33 is imprinted with a shutter time scale 35 covering the complete range of shutter speeds from $\frac{1}{800}$ of a second to four full seconds. From Fig. 7, it will be noted that the scale 35 includes the following markings $\frac{1}{800}$, $\frac{1}{400}$, $\frac{1}{200}$, $\frac{1}{100}$, $\frac{1}{50}$, cine/25, $\frac{1}{10}$, $\frac{1}{5}$, $\frac{1}{2}$, 1, 2 and 4. The marking "cine/25" denotes $\frac{1}{25}$ of a second with the word "cine" denoting that as the speed of operation of the home-type movie cameras when set to operate at their normal speed for 16 frames per second. Therefore, the marking "cine/25" will be used when operating still cameras at $\frac{1}{25}$ of a second or when operating most home movie cameras at the normal speed of 16 frames per second. Readings obtained from the meter when set at the "cine/25" setting can also be used for determining the settings when operating the movie camera at other speeds than 16 frames per second, by making suitable adjustment sin the camera setting. For example, when operating the movie camera at 8 frames per second the exposure is halved, when operating the movie camera at 32 frames per second the exposure is doubled and when operating the movie camera at the slow speed of 64 frames per second the exposure is tripled. Both the lens stop scale 34 and the shutter time scale 35 are arranged concentrically on the face of the indicia disc 33.

Means is provided for rotatively mounting the indicia disc 33 upon the wall of the bottom section 21 so that it may be pre-set for a desired shutter time, as will become clear as this specification proceeds. The rotative mounting of the indicia disc 33 is accomplished by a knob 36 which is fitted concentrically into a recess 37 formed in the back wall of the bottom section 21. The periphery of the knob 36 is formed with serrations 38 by which a grip can be had on the knob 36 for rotating the same. One side of the knob 36 is formed with a reduced concentric projection 39 which extends rotatively into a complementary hole 40 formed concentrically within the recess 37. The projection 39 has a thickness corresponding to the thickness of the back wall of the bottom section 21 so that the inner face of the projection 39 is flush with the inner face of that wall. The indicia disc 33 is rested concentrically on the inner end of the knob 36 with its scales 34 and 35 uppermost and a metallic clamp disc 41 is rested on the top face of the indicia disc 33 concentrically therewith. The clamp disc 41 is formed with a concentric hole 42, the indicia disc 33 has a concentric hole 43 and the knob 36 has a concentric threaded hole 44. A screw 45 is passed through the holes 42 and 43 and is threaded into the hole 44 of the knob 36 securing the clamp disc 41 and the indicia disc 33 to the knob 36. Extending from the inner end of the knob 36, there is an eccentric peg 46 which projects into aligned eccentric holes 47 and 48, in the indicia disc 33 and the clamping disc 41, respectively, insuring that the indicia disc 33 will be rotated when the knob 36 is rotated.

Overlying the indicia disc 33 and located beneath the free end of the needle 25, there is an indicia plate 49. The indicia plate 49 is also preferably made of relatively stiff, thin cardboard but can be made of metal, synthetic resin or plastic material or any other similar material. Adjacent corners of the indicia plate 49 are formed with apertures 50 for engagement about the nuts 30, as shown in Figs. 3 and 5, for retaining the indicia plate 49 in a fixed position within the casing 20. Extending from the inner face of the top section 22 within the transparent area indicated by the letters A in Figs. 3 and 5, there is a pair of spaced transparent pegs 51 and 52. The free ends of the pegs 51 and 52 engage the face of the indicia plate 49 and maintain that plate 49 in position on the face of the indicia disc 33 in which it frictionally resists free rotation of that indicia disc 33 so as to maintain it in manually adjusted positions. The pegs 51 and 52 also limit the swinging movements of the needle 25 with that needle having a "zero" position against the peg 52, as shown in Figs. 1 and 5.

The indicia plate 49 is of a size to extend over and cover the shutter time scale 35 of the indicia disc 33 and is formed with an arcuate edge 53. The arcuate edge 53 is arranged concentric with the axis of rotation of the indicia disc 33 and beyond that edge, the numbers of the lens stop scale 34 are exposed as clearly shown in Figs. 1 and 10.

The indicia plate 49 is further formed with an arcuate slot 54 also arranged concentric with the axis of rotation of the indicia disc 33 and through which the numbers of the shutter time scale 35 can be viewed, also as shown in Figs. 1 and 10. Imprinted on the face of the indicia plate 49 adjacent the slot 54 there is a film speed or sensitivity scale 55 calibrated in numbers in accordance with the ASA (American Standards Association) system. From Fig. 6, it is apparent that the numbers of the scale 55 are 4, 6, 8, 12, 16, 24, 32, 48, 64, 96 and 128. The scale 55 is numbered in accordance with the ASA system in view of that system's gaining popularity, but it is appreciated that the scale could also be calibrated in numbers of the GE (General Electric) or Weston systems without departing from the scope and intent of the present invention.

Outwardly of the slot 54, the face of the indicia plate 49 is imprinted with guide lines 56 which radiate from the axis of rotation of the needle 25 for permitting pivoted positions of the needle to be carried to the numbers of the lens stop scale 34 of the indicia disc 33 for reading the proper lens opening.

The manner of using the direct-reading photoelectric exposure meter of the present invention is as follows:

For the purpose of illustrating the invention, let it be assumed that "Verichrome" (Eastman Kodak Company) film having an ASA sensitivity rating of 50 is being exposed in an adjustable camera under ideal lighting conditions outdoors. The subject to be filmed is an average one in bright sunlight so that a shutter speed of 1/50 of a second will be used.

First, the meter must be set to align 1/50 of a second on the shutter time scale 35 of the indicia disc 33 with the film speed of 50 on the film speed scale 55. Referring to Fig. 10, the knob 36 is rotated to in turn rotate the indicia disc 33 to bring the number 1/50 of the scale 35 into alignment with the 50 position on the scale 55. Actually, there is no 50 on the scale 55 so that the number 1/50 is turned to a position just slightly to the right of the numeral 48—that is between the numerals 48 and 64 of the scale 55 as shown in Fig. 10.

Then the meter is held upright in a position adjacent the subject to be photographed so that the same light falls on the transparent blister 26 as falls on the subject. The light will pass through the blister and strike the light sensitive cell of the light sensitive unit 24 and set up a small electric current and activate the milliammeter of the light sensitive unit 24 and cause the needle 25 to move to the position shown in Fig. 10. Alignment of the selected shutter time with the proper film speed number causes the proper stop numbers of the scale 34 to be exposed beyond the arcuate edge 53 of the indicia plate 49. With the needle 25 in the pivoted position shown in Fig. 10, the guide lines 56 of the indicia plate 49 are used to visually project the end of the needle 25 to read the scale 34. From Fig. 10, it will be noted that the proper lens opening to be used for taking the picture, under the conditions set forth above, is F11. The camera is promptly set at F11, without the need of making any further computations, and the picture is snapped before the lighting conditions change or the subject has an opportunity to change its position.

A small metallic disc 57 is secured to the top of the casing 20, at the rear thereof, by an eccentrically located rivet 58. The disc 57 is positioned within an arcuate rib 59 formed on the rear face of the casing 20 so as to retain the disc 57 from rotating about the rivet 58. A portion of the disc 57 projects beyond the top of the casing 20 and is formed with an aperture 60 through which the conventional neck strap (not shown) is to be engaged for suspending the meter from the neck, as is generally known in the exposure meter art.

It is appreciated, that, if desired, the film speed scale 55 could be on the indicia disc 33 and the shutter time scale could be on the indicia plate 49, instead of the arrangement shown on the drawing, or the physical positions of all three scales could be varied without affecting the principle involved in this invention. Also, the scales need not necessarily be concentric, but may be arranged to move horizontally in relation to each other. The present invention is concerned chiefly with the construction of an exposure meter in which there is no light-measuring scale and in which the indicator of the light-sensitive unit moves over a scale directly in terms of lens-stop or lens-opening numbers and in which the calibration is directly varied with relation to changes in the film speed setting or shutter-time setting so that the same deflection of the indicator for a given light condition will indicate different lens stops in accordance with the shutter time and film speed being used at that time.

While the meter of the present invention is designed for determining proper exposures in accordance with the incident light method, it is appreciated that the meter could also be constructed to be direct-reading and to determine exposures in accordance with the reflected light method, without departing from the scope of the present invention.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A direct-reading photo exposure meter, comprising a casing enclosing at one end a light sensitive unit including a milli-ammeter operatively connected to a pivotally mounted needle having a limited area of sweep within the other end of the casing, said needle being operatively connected to said unit an indicia disc rotatively mounted within the said other end of said casing beneath said needle, an indicia plate fixedly mounted within the said other end of said casing over said disc and beneath said needle, said indicia disc having a concentric outer scale calibrated in F stop numbers and a concentric inner scale calibrated in shutter time numbers, said indicia plate having an arcuate edge concentric with the axis of rotation of said indicia disc beyond which said F stop number scale is exposed, said indicia plate having an arcuate slot concentric with the axis of rotation of said indicia disc within which said shutter time number scale is exposed, and a scale calibrated in numbers of film speed arranged concentrically on said indicia plate along an edge portion thereof defining said arcuate slot, said casing being of two part construction secured together by nut and bolt assemblies extended through the casing adjacent the said one end thereof, said light sensitive unit being positioned on the bolts of said nut and bolt assemblies and secured in position by nuts threaded onto said bolts within said casing, said indicia plate having apertures in adjacent corners through which said latter-mentioned nuts are extended locating said indicia plate within said casing, and pegs integrally molded within said casing and having their free ends engaging the face of said indicia plate holding the same down in position on said indicia disc.

2. A direct-reading photo exposure meter, comprising a casing enclosing at one end a light sensitive unit including a milli-ammeter operatively connected to a pivotally mounted needle having a limited area of sweep within the other end of the casing, said needle being operatively connected to said unit and indicia disc rotatively mounted within the said other end of said casing beneath said needle, an indicia plate fixedly mounted within the said other end of said casing over said disc and beneath said needle, said indicia disc having a concentric outer scale calibrated in F stop numbers and a concentric inner scale calibrated in shutter time numbers, said indicia plate having an arcuate edge concentric with the axis of rotation of said indicia disc beyond which said F stop number scale is exposed, said indicia plate having an arcuate slot concentric with the axis of rotation of said indicia disc within which said shutter time number scale is exposed, and a scale calibrated in numbers of film speed arranged concentrically on said indicia plate along an edge portion thereof defining said arcuate slot, said rotative mounting of said indicia disc comprising a knob mounted rotatively through the wall of said casing to the rear of said indicia disc and formed with a concentric threaded hole, a clamp plate concentrically overlying said indicia disc, and a screw passed through alinged concentric holes formed in said clamp plate and said indicia disc and threaded into the hole of said knob.

3. A direct-reading photo exposure meter, comprising a casing enclosing at one end a light sensitive unit including a milli-ammeter operatively connected to a pivotally mounted needle having a limited area of sweep within the other end of the casing, said needle being operatively connected to said unit an indicia disc rotatively mounted within the said other end of said casing beneath said needle, an indicia plate fixedly mounted within the said other end of said casing over said disc and beneath said needle, said indicia disc having a concentric outer scale calibrated in F stop numbers and a concentric inner scale calibrated in shutter time numbers, said indicia plate having an arcuate edge concentric with the axis of rotation of said indicia disc beyond which said F stop number scale is exposed, said indicia plate having an arcuate slot concentric with the axis of rotation of said indicia disc within which said shutter time number scale is exposed, and a scale calibrated in numbers of film speed arranged concentrically on said indicia plate along an edge portion thereof defining said arcuate slot, said rotative mounting of said indicia disc comprising a knob mounted rotatively through the wall of said casing to the rear of said indicia disc and formed with a concentric threaded hole, a clamp plate concentrically overlying said indicia disc, and a screw passed through aligned concentric holes formed in said clamp plate and said indicia disc and threaded into the hole of said knob, and means locking said indicia disc to said knob for insuring rotation of said indicia disc when said knob is turned.

4. A direct-reading photo exposure meter, comprising a casing enclosing at one end a light sensitive unit including a milli-ammeter operatively connected to a pivotally mounted needle having a limited area of sweep within the other end of the casing, said needle being operatively connected to said unit an indicia disc rotatively mounted within the said other end of said casing beneath said needle, an indicia plate fixedly mounted within the said other end of said casing over said disc and beneath said needle, said indicia disc having a concentric outer scale calibrated in F stop numbers and a concentric inner scale calibrated in shutter time numbers, said indicia plate having an arcuate edge concentric with the axis of rotation of said indicia disc beyond which said F stop number scale is exposed, said indicia plate having an arcuate slot concentric with the axis of rotation of said indicia disc within which said shutter time number scale is exposed, and a scale calibrated in numbers of film speed arranged concentrically on said indicia plate along an edge portion thereof defining said arcuate slot, said rotative mounting of said indicia disc comprising a knob mounted rotatively through the wall of said casing to the rear of said indicia disc and formed with a concentric threaded hole, a clamp plate concentrically overlying said indicia disc, and a screw passed through aligned concentric holes formed in said clamp plate and said indicia disc and threaded into the hole of said knob, and an eccentric peg extending from the inner end of said knob and projected into aligned eccentric holes formed in said indicia disc and said clamp plate locking said indicia disc to said knob for insuring rotation of said indicia disc when said knob is turned.

JACOB L. RIFKIN.

REFERENCES CITED

The following references are of record in the file of this patent:

UNITED STATES PATENTS

| Number | Name | Date |
|---|---|---|
| 2,178,197 | Bing | Oct. 31, 1939 |
| 2,421,504 | Hickok | June 3, 1947 |
| 2,461,930 | Simpson | Feb. 15, 1949 |
| 2,481,678 | Mihalyi | Sept. 13, 1949 |